United States Patent [19]

Hetland et al.

[11] 4,162,751
[45] Jul. 31, 1979

[54] ROTARY MEASURING CHAMBER WITH SIZE ADJUSTMENT

[76] Inventors: Lillian Hetland, P.O. Box 882 (Park Ave. P.O.), Pomona, Calif. 91766; Peter R. Schneeweiss, 1630 W. Covina Blvd., #108, San Dimas, Calif. 91773

[21] Appl. No.: 756,090

[22] Filed: Jan. 3, 1977

[51] Int. Cl.² ............................................. G01F 11/24
[52] U.S. Cl. ..................... 222/293; 222/305; 222/306; 222/307; 222/368
[58] Field of Search ............... 222/306, 307, 308, 363, 222/368, 438, 440, 293, 305; 92/13, 13.5, 13.7, 60.5

[56] References Cited

U.S. PATENT DOCUMENTS

| | | | |
|---|---|---|---|
| 491,064 | 1/1893 | Nichols | 222/293 |
| 1,728,526 | 9/1929 | Brunhoff | 222/363 X |
| 1,750,979 | 3/1930 | Webb | 222/440 X |
| 1,982,917 | 12/1934 | Lothrop et al. | 222/306 X |
| 2,083,094 | 6/1937 | Rose | 222/293 |
| 3,147,893 | 9/1964 | Mittelsteadt | 222/306 |
| 3,253,496 | 5/1966 | Beach et al. | 222/368 X |
| 3,982,673 | 9/1976 | Brussel et al. | 222/306 |

*Primary Examiner*—David A. Scherbel
*Attorney, Agent, or Firm*—Boniard I. Brown

[57] ABSTRACT

A measuring-and-dispensing apparatus adapted to be removably secured to a jaw having powdered or granulated material disposed therein, whereby the material can be dispensed in a predetermined, measured quantity, the materials generally being, for example, instant coffee, tea, sugar, etc., the cap comprising a housing having a rotor arranged therein, including an adjustable measuring compartment to receive the materials therein, the rotor being rotatably mounted in the cap housing and said rotor having a selector device and an operating handle attached thereto, whereby the compartment can be moved from a filling position to a dispensing position.

6 Claims, 11 Drawing Figures

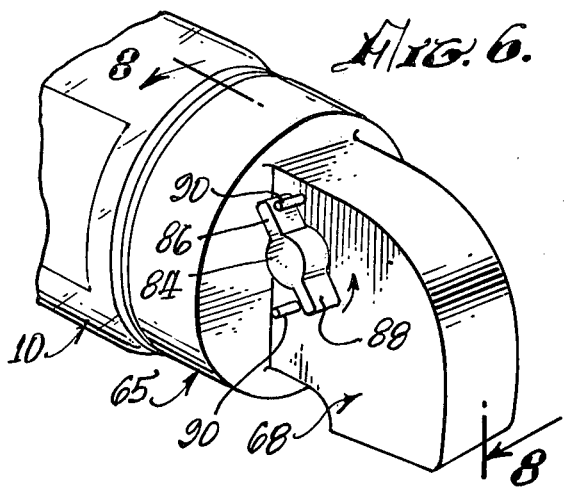
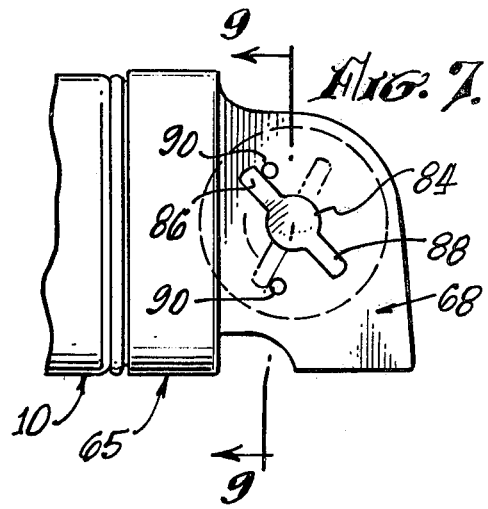
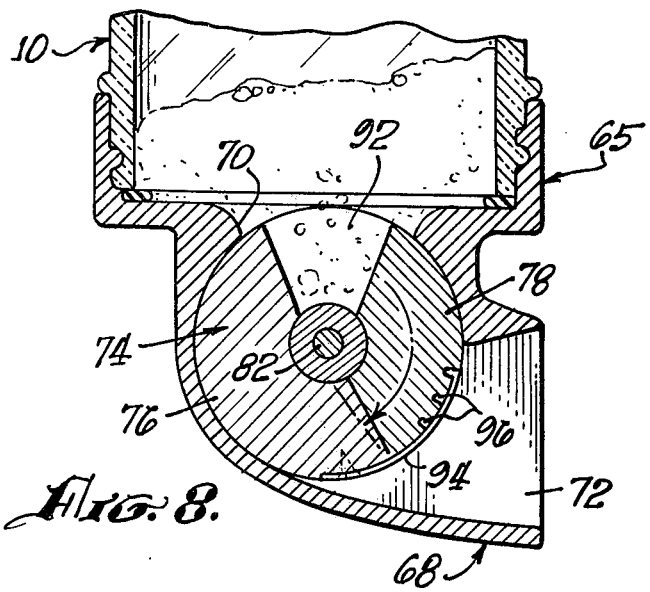
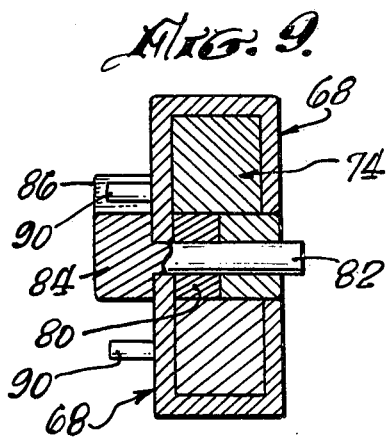
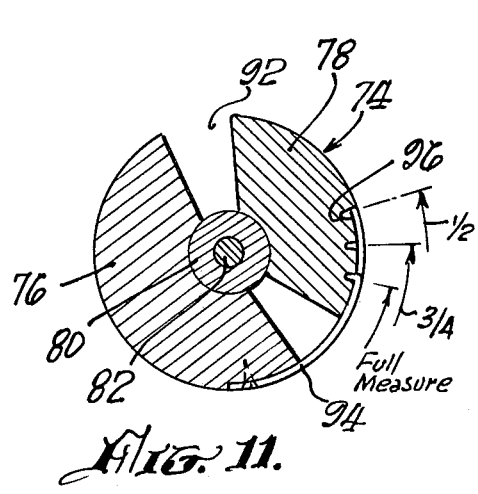
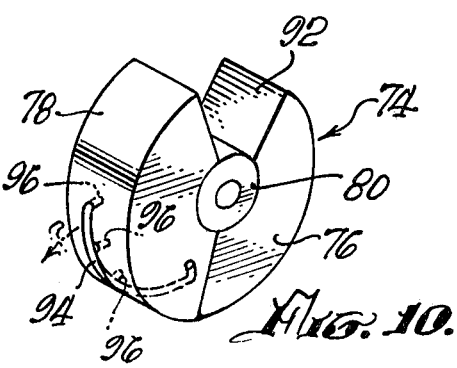

ROTARY MEASURING CHAMBER WITH SIZE ADJUSTMENT

BACKGROUND OF THE INVENTION

1. Field of the Invention

This invention relates generally to a dispensing apparatus and, more particularly, to a dispensing cap arranged to be attached to any well known jar having powdered or granulated material stored therein to be dispensed in a predetermined quantity.

2. Description of the Prior Art

As is well known in the art, several problems and difficulties are encountered in providing suitable means for extracting or dispensing various types of granulated or powdered materials from a jar-like container wherein the material is stored.

With the increased packaging of a variety of food products that are in powdered or granulated form, there has developed a need to provide a means by which such items as instant or ground coffee, tea, sugar, powdered artificial creams, etc, can be easily dispensed directly from their original containers. And, in addition, it is very desirable to be able to dispense such materials in predetermined amounts directly from their containers, without the need of removing the caps or any elements thereof.

Not only is there a need to solve the above mentioned problems, but there also should be included a means wherein the contents can be extracted from their jars under a sealed condition, in order to preserve the freshness of the individual product, especially when the material is a food product as herebefore mentioned.

At present, when one wants to extract an ingredient from a jar, the lid thereof is removed and a spoon is inserted therein to remove an individual amount; this amount will generally vary and one will seldom extract the exact amount each time.

Secondly, the cap can be left off the jar for long periods of time, whereby certain types of ingredients will quickly lose their freshness and aroma, particularly coffee and tea.

SUMMARY OF THE INVENTION

The present invention comprises a measuring-and-dispensing apparatus formed as an integral part of a cap device capable of being removably secured to most known types of jars having various powdered or granulated products stored therein.

The measuring-and-dispensing cap comprises a housing integrally formed as part of the cap having typical internal threads to match the threads of the jar. The housing defining a discharge spout is arranged with an inlet opening and an outlet opening having a rotatable rotor disposed therebetween. The rotor includes a measuring chamber which is volumetrically adjustable to provide for a predetermined quantity of material to be discharged therefrom.

In one arrangement, the volumetric adjustment is made by adjusting the location of a piston through a rack-and-pinion arrangement operated by a selector knob. Thus, the area of the measuring chamber can be controlled.

In another arrangement, the volumetric compartment is controlled by providing a segmented rotor wherein one segment is smaller than the other, and they can be locked in spaced relation to each other, whereby an adjustable compartment can be regulated therebetween.

OBJECTS AND ADVANTAGES OF THE INVENTION

The present invention has for an important object a provision whereby the contents of the average well known jars containing various powdered or granulated food products can be readily dispensed in a predetermined quantity wherein the ingredients therein are kept fresh at all times.

It is another object of the invention to provide a measuring-and-dispensing apparatus that includes a cap portion having a spout housing integrally formed therewith to support a volumetrically adjustable rotor, wherein the rotation thereof will discharge a predetermined amount of material from the jar.

It is still another object of the invention to provide a measuring-and-dispensing apparatus that includes a rack-and-pinion, adjustable piston whereby with the simple adjustment of a knob, the volume can be changed.

It is a further object of the invention to provide an apparatus of this character having relatively few operating parts.

It is still a further object of the invention to provide a device of this character that is easy to service and maintain.

Still another object of the present invention is to provide an apparatus of this character that is relatively inexpensive to manufacture.

It is still a further object of the invention to provide a measuring-and-dispensing apparatus of this type that is simple and yet rugged in construction.

The characteristics and advantages of the invention are further sufficiently referred to in connection with the accompanying drawings, which represent various embodiments. After considering these examples, skilled persons will understand that other variations may be made without departing from the principles disclosed and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 6 is a perspective view of an alternative arrangement of the present invention;

FIG. 7 is a side-elevational view thereof in a discharge mode;

FIG. 8 is an enlarged, cross-sectional view taken substantially along line 8—8 of FIG. 6, with the apparatus in a filling mode;

FIG. 9 is a cross-sectional view taken along line 9—9 of FIG. 7;

FIG. 10 is a perspective view of the rotor member used in the alternative arrangement shown in FIG. 8; and FIG. 11 is a cross-sectional view of the measuring and dispensing rotor, wherein the compartment is adjusted to the smallest volume.

DESCRIPTION OF THE PREFERRED EMBODIMENT

Figure 1:
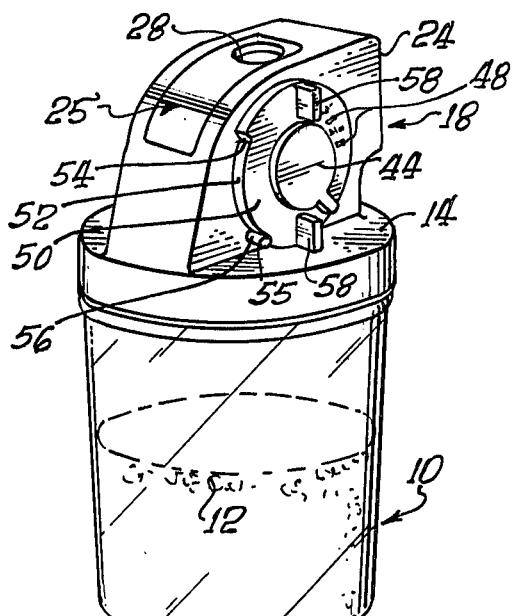
FIG. 1 is a perspective view of the present invention mounted to a conventional jar.

Referring more particularly to the embodiment as shown in FIGS. 1 through 5, there is illustrated a well known type of container jar, generally indicated at 10. It should be understood that the specific design of the invention, that being a measuring-and-dispensing apparatus, includes a device that is readily attached to various jar-like containers, particularly the type that contains food products, such as instant coffee, tea, powdered cream, sugar and the like dry ingredients. Therefore, by way of example and to simplify the description, the material indicated at 12 will be referred to as instant coffee, so as to provide ease in understanding the apparatus and its use.

Accordingly, there is shown a cap-mounting body 14 having internal threads 16 of the conventional type to match the threads of the jar. Integrally formed as part of cap body 14 is a dispensing housing, indicated generally at 18, wherein there is defined a curved throat 20 having an inlet port 22 disposed in the cap body adjacent the jar opening and an outlet port 24 whereby the ingredients 12 therein can be discharged. It should be noted that the walls of inlet opening 22 are inclined downwardly and inwardly to provide a smooth guide for coffee, etc., being poured.

Figure 2:
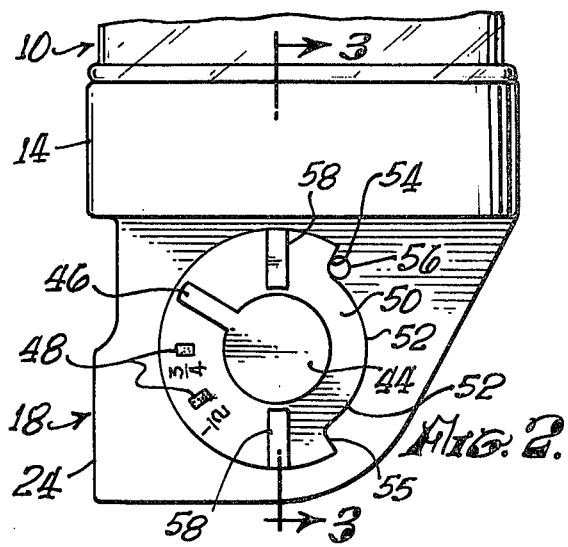
FIG. 2 is a partial, enlarged view of the apparatus in an inverted, dispensing mode.
Figure 3:
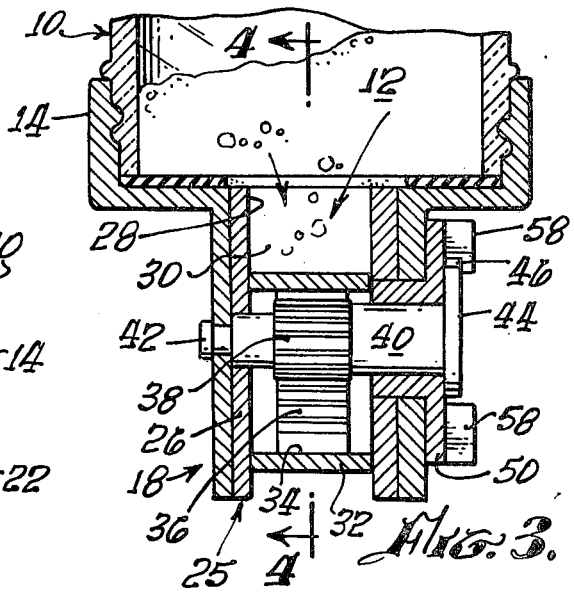
FIG. 3 is a cross-sectional view taken substantially along line 3—3 of FIG. 2.
Figure 4:
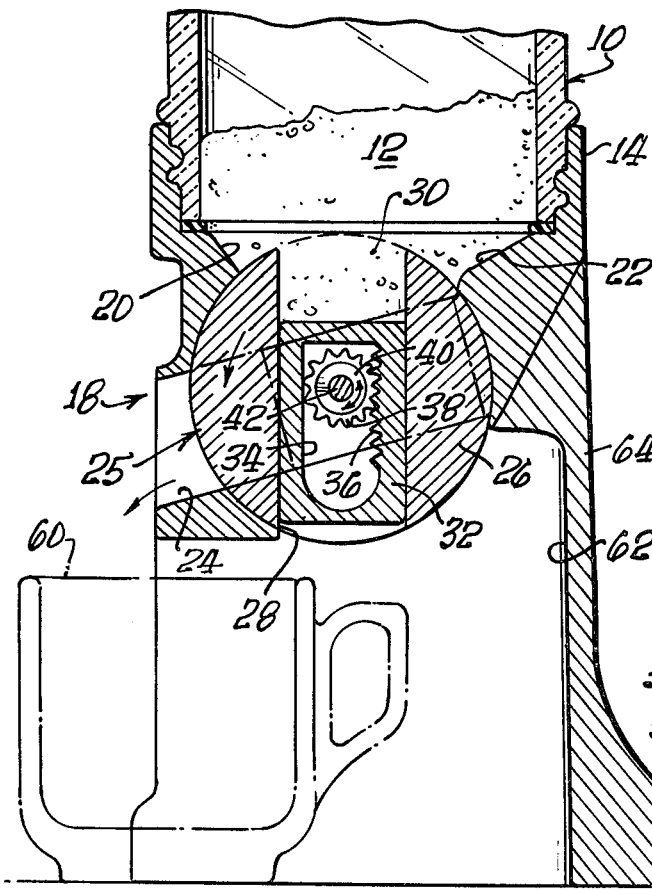
FIG. 4 is a cross-sectional view taken substantially along line 4—4 of FIG. 3 showing the apparatus supported in a free-standing support unit.
Figure 5:
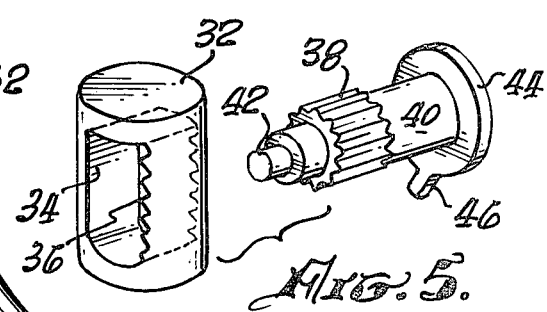
FIG. 5 is an exploded view of the piston and its related operating parts.

That is, the jar and dispenser are turned upside down, as shown in FIGS. 2 through 4, whereby the material 12 will fill the area adjacent the throat opening, thereby allowing the material to enter a rotary-valve means, designated at 25. Said rotary-valve means comprises a rotor 26 rotatably mounted in throat 20 of housing 18, the rotor including an enlarged bore 28 wherein a portion thereof provides an adjustable volumetric compartment 30 that is defined by an adjustable piston 32. Piston 32 is formed having a central slot 34 that includes one wall thereof having a plurality of teeth arranged thereon representing a rack 36 in which a pinion gear 38 is operably received therein. Thus, a rack-and-pinion means is formed to provide slidable movement to piston 32. Hence, measuring compartment or chamber 30 can be adjusted to receive a predetermined volumetric amount of material to be dispensed from the container 10.

In order to operate the rack-and-pinion means, a shaft 40 is included and passes from one side of housing 18 to the other, as seen in FIG. 3. The outer free end 42 of shaft 40 is arranged to be held in place, while the opposite end thereof is arranged having a dial-type knob 44 that can be rotated according to the amount of material one wishes to have dispensed.

In FIG. 2, knob 44 is shown having a pointer 46 which is positioned to allow one teaspoonful of material to be dispensed. Other markings indicate three-quarters and one-half teaspoonful measurements, indicated at 48. Accordingly, knob 44 can be rotated to any position, thereby causing pinion gear 38 to move rack 36 which, in turn, moves piston 32 in bore 28. It should be noted that a portion of shaft 40 is journaled in the rotating head 50 which is secured to rotor 26.

Once piston 32 is adjusted to provide the desired volume of material, head 50 is rotated, causing the rotor, piston and valve means to rotate about the axis of shaft 40 so as to position compartment 30 with the discharge outlet 24, as indicated in phantom lines in FIG. 4. In order to control the rotation of rotor 26, head 50 includes an annular recess 52 having oppositely arranged shoulders 54 and 55, respectively. Shoulder 54 abuts stop pin 56 when compartment 30 is in a filled or closed position, and shoulder 55 strikes pin 56 to limit the rotational movement so as to align compartment 30 with discharge outlet 24. To aid in the turning of head 50, a pair of laterally extended ears 58 are integrally formed thereon.

Referring more particularly to FIG. 4, there is shown a means by which the entire measuring-and-dispensing apparatus, including jar 10, is mounted in an inverted position. Thus, if one has instant coffee in container 10, the cup 60 is positioned under the outlet opening 24 and is received in cavity 62 of the support stand 64, the stand being arranged to receive and hold housing 18, and allow access to knob 45 and head 50.

Referring now to a second embodiment which is illustrated in FIGS. 6 through 10, there is generally shown a container jar 10 having a dispenser apparatus designated at 65 secured thereto, wherein the apparatus comprises a cap body 66 as previously described, and a housing 68 having a similar inlet and outlet 70 and 72, respectively.

However, the rotor mean 74 is arranged in two segmented elements, element 76 being referred to as a fixed member and element 78 being referred to as the movably adjustable member. Segment member 76 is affixed to bushing member 80 which in turn is affixed to shaft 82. Shaft 82 has a head 84 with a pair of oppositely disposed, laterally extending ears 86 and 88. Ear 86 is arranged to engage stop pins 90, whereby the rotation of rotor 74 is controlled to allow compartment 92 to be moved from a fill to a discharge position and back again.

The adjusting means to regulate the amount of volumetric area of compartment 92 comprises a flexible arm 94 having one end thereof secured to segment member 76 and the other releasably engaging any one of a plurality of set holes 96.

Thus, as seen in FIG. 8, compartment 92 is open as wide as it can be; and in FIG. 11 compartment 92 is smaller and arm 94 is located in a different set hole. There can be various numbers of holes; however, it is preferred that three holes will be used to regulate such materials as instant coffee, tea, sugar and like products, so as to be adjusted for individual taste.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned, except as defined in the accompanying claims.

The inventor claims:

1. A measuring-and-dispensing apparatus to be employed with jar containers to dispense various granulated and powdered materials, wherein said apparatus comprises:

a cap-mounting body arranged to be removably secured to said jar container, a housing on said cap and having a throat disposed therein wherein said throat includes an inlet opening and a discharge outlet opening, said inlet opening being formed with downwardly inclined walls whereby a smooth flow of material will enter said compartment, rotor valve means disposed within said housing, said rotor valve means comprising a rotor body rotatably mounted within said throat, said body having an enlarged bore disposed therethrough, a slidable piston adjustably positioned within said bore of said rotor body to define therewith an adjustable volumetric compartment, said piston carrying volumetric adjustment means including a longitudinal slot, a rack formed in said slot, a pinion gear rotatable within said slot, a shaft on which said pinion gear is mounted having a free end and a knob on the opposite end to adjust and set a predetermined volume of said compartment, and stop means to control the rotational movement of said rotor valve means.

2. An apparatus as recited in claim 1, wherein said rotor valve includes a head positioned adjacent said housing whereby said valve is manually rotated thereby, said head having an annular recess disposed therein to engage said stop means secured to said housing.

3. An apparatus as recited in claim 2, wherein said cap body includes internal threads to match the threads formed on said jar container.

4. A measuring-and-dispensing apparatus to be employed with jar containers to dispense various granulated and powdered materials, wherein said apparatus comprises:

a cap-mounting body arranged to be removably secured to said jar container, a housing on said cap and having a throat disposed therein wherein said throat includes an inlet opening and a discharge outlet opening, rotor valve means disposed within said housing and having an adjustable volumetric compartment, said inlet opening being formed with downwardly inclined walls whereby a smooth flow of material will enter said compartment, said rotor valve means comprising first and second segments defining said adjustable volumetric compartment therebetween, a bushing member affixed to the first segment wherein the second segment is rotatable relative to said first segment, a rotatable shaft mounted in said housing and fixed to said bushing whereby said segments rotate with said shaft, said shaft having a head member for manual rotation thereof, and stop means to control the rotational movement of said rotor valve means.

5. An apparatus as recited in claim 4, wherein said means for adjusting the volumetric area of said compartment comprises:

a flexible arm member attached to one of said segment members;

a plurality of adjusting holes disposed in said other segment member and arranged to removably receive said arm member therein.

6. An apparatus as recited in claim 1 and further including a support stand arranged to support said jar and apparatus in an inverted position, said support stand defining an opening adapted to receive and extend partially about a cup positioned under said inverted apparatus to receive material from said discharge opening of the housing.

* * * * *